United States Patent
Gao et al.

(10) Patent No.: US 7,702,173 B2
(45) Date of Patent: Apr. 20, 2010

(54) IMAGE PROCESSING METHOD, IMAGE PROCESSING APPARATUS AND IMAGE PROCESSING PROGRAM

(75) Inventors: Qing Gao, Hino (JP); Tetsuya Katagiri, Kyoto (JP)

(73) Assignee: Konica Minolta Holdings, Inc. (JP)

( * ) Notice: Subject to any disclaimer, the term of this patent is extended or adjusted under 35 U.S.C. 154(b) by 1027 days.

(21) Appl. No.: 11/341,036

(22) Filed: Jan. 27, 2006

(65) Prior Publication Data

US 2006/0170978 A1    Aug. 3, 2006

(30) Foreign Application Priority Data

Jan. 31, 2005    (JP) ............................. 2005-022657

(51) Int. Cl.
*G06K 9/40* (2006.01)

(52) U.S. Cl. ...................................... 382/260; 382/264

(58) Field of Classification Search ................. 382/254, 382/260, 264, 266, 268, 235, 243, 252, 275; 358/3.26, 518, 520, 3.27, 463
See application file for complete search history.

(56) References Cited

U.S. PATENT DOCUMENTS

| 7,415,163 | B2* | 8/2008 | Nishi et al. | 382/275 |
| 2004/0071363 | A1* | 4/2004 | Kouri et al. | 382/276 |
| 2004/0096103 | A1* | 5/2004 | Gallagher et al. | 382/167 |

* cited by examiner

*Primary Examiner*—Yon Couso
(74) *Attorney, Agent, or Firm*—Cantor Colburn LLP

(57) ABSTRACT

An image processing method, for extracting a base component from image data including a detailed component and the base component, containing the steps of extracting the base component by application of an edge preserving filter to the image data; and correcting the portion, of the extracted base component, corresponding to a predetermined frequency component of the original image data.

10 Claims, 14 Drawing Sheets

IMAGE PROCESSING METHOD, IMAGE PROCESSING APPARATUS AND IMAGE PROCESSING PROGRAM

The present invention claims priority under 35 U.S.C. §119 to Japanese Application No. 2005-022657 filed Jan. 31, 2005, which is incorporated herein by reference.

BACKGROUND OF THE INVENTION

1. Field of the Invention

The present invention relates to an image processing method, an image processing apparatus and an image processing program, particularly to an image processing method, an image processing apparatus and an image processing program capable of extracting at least the base components contained in image data, wherein this image data contains the detailed components and the base components.

2. Description of the Related Art

The image data contains the detailed components wherein the signal value of each pixel varies on a step-by-step basis as compared with that of the peripheral pixel, and the base components wherein the signal value of each pixel does not vary on a step-by-step basis as compared with that of the peripheral pixel. The detailed components as used herein denote minute changes in an image, whereas the base components indicate changes in almost uniform brightness within a predetermined range of the image.

In the waveform diagram showing the signal value of the image data given in FIG. 13, the solid line indicates the signal value of the image data. To be more specific, the image data contains the detailed components wherein the signal value of each pixel varies on a step-by-step basis as compared with that of the peripheral pixel, and the base components wherein the signal value of the detailed components is shifted by a predetermined amount.

To compress the dynamic range of the image data in various forms of image processing, the base component of the image data is separated from the detailed component, and this base component alone is compressed first. Then the base component and detailed component are synthesized. Such a procedure is often utilized.

The aforementioned procedure compresses the base component where the amplitude of the signal value is greater, but fails to compresses the detailed component. Thus, although the portion pertaining to brightness of the image is compressed, the subtle delineation or delicate feeling of the image are preserved undamaged. Such an advantage is provided by the procedure.

In the separation between the base component and detailed component, the base component is identified as a low frequency component, while the detailed component is assumed as a high frequency component. The difference in frequency components is employed to implement separation between the base component and detailed component.

To extract the base component when implementing the separation, a filter having a predetermined magnitude (a smoothing filter) is applied to the relevant image, and the average value of the peripheral pixels. In this case, assume the image data containing the portion (edge portion) wherein the signal value of the base component exhibits an abrupt change, as shown in FIG. 14(a). Here, if the smoothing filter is used to extract the base component, the edge portion contained in the original base component, namely, the signal value of the base component exhibits an abrupt change which will cause blur, as shown by the solid line in FIG. 14(b), which means that the edge portion becomes less sharp and smoother.

When the base component extracted in the manner is compressed (FIG. 14(b)) and is synthesized with the detailed component, a blurred component or faint false contour-like component called "halo" will appear, as shown in FIG. 14(c).

Originally, the halo is not compressed because the high frequency component originally contained in the base component is not detected as a base component. This is considered to give an adverse effect to detailed components.

To prevent the halo from occurring, it has been proposed to use a filter (called the edge preserving filter) capable of identifying the high frequency component as the edge portion and extracting the base component while preserving the high frequency component of this edge portion.

FIG. 15 shows an example of the operation by the edge preserving filter. Assume the image data wherein an edge portion is present in the base component as shown in FIG. 15(a).

In this case, if the edge preserving filter, instead of the smoothing filter shown in FIG. 14, is used to extract the base component, the edge portion of the base component, as well as the original base component (wavy line of FIG. 15(b)) is kept clear without being blurred, as shown by the solid line of FIG. 15(b).

Thus, when the base component (FIG. 15(b)) extracted with the edge portion preserved is compressed and the detailed portion is synthesized, then an image data free from halo can be produced, as shown in FIG. 15(c).

As a result, the base component having a large amplitude of signal value is compressed without the detailed component being compressed. This arrangement ensures that the portion such as brightness in the image is compressed, with the delicate delineation of the image kept undamaged.

The edge preserving filter includes various types of filters incorporating diverse techniques such as a bilateral filter, $\epsilon$-filter and median filter. The details of the bilateral filter are given in "Fast Bilateral Filtering for the Display of High-Dynamic-Range Images" Fredo Durand and Julie Dorsey, SIGGRAPH 2002.

To get the similar results as those of the edge preserving filter, only the smaller amplitude component, not the greater amplitude component, is smoothed, whereby the base is extracted. This method is disclosed in the Official Gazette of Japanese Patent 2001-275015 (FIG. 1 on page 1).

According to the method disclosed in the documents, use of an edge preserving filter provides the advantage of extracting the base hardly allowing the high-frequency edge portion to be blurred. However, in order to ensure thorough extraction of the edge portion, processing is applied in such a way that the portion over a certain frequency is identified as the edge portion. This arrangement allows part of the portion of intermediate frequency to be identified as the edge, with the result that detection error occurs. Thus, smooth transition of the pixels of that portion will be lost and a pseudo edge will be produced.

Assume the image data including a portion where the signal value of the base component exhibits a smooth transition (smooth edge portion), as shown in FIG. 16(a). In this case, if the base component is extracted using the edge preserving filter, the smooth portion contained in the original base component (wavy line of FIG. 16(b)) is adversely affected by the intermediate through high frequency components, as shown by the solid line of FIG. 16(b). This will produce a detection error. Thus, the base component to be extracted will exhibit a waveform wherein the signal value is subjected to abrupt changes.

If the base component extracted on the basis of detection error is (FIG. 16(b)) is compressed and is synthesized with the detailed component, a component similar to the pseudo contour known by the name of "edge error" will appear, as shown in FIG. 16(c).

Since the edge preserving filter does not extract the high frequency component having a smaller amplitude, it can be used to eliminate noise. However, some noise components pass through the edge preserving filter, because of frequency component or amplitude. Accordingly, the edge preserving filter is not sufficient when used to eliminate noise. Such a problem has been left unsolved in the conventional art.

SUMMARY OF THE INVENTION

Embodiments of the present invention may solve these problems. Embodiments of the present invention may also ensure correct extraction of the edge of the base component contained in the image data.

An embodiment of the present invention may provide image processing wherein the original edge portion is correctly preserved and the base component is extracted, independently of whether the edge of the base component contained in the image data is subjected to abrupt or gradual changes.

An embodiment of the present invention may correctly remove the noise component contained in the image data.

An embodiment of the present invention may provide image processing capable of removing only the noise components correctly, even if the image data contains the noise components having different amplitudes and frequencies.

These and other features may be attained by an image processing method, for extracting a base component from image data including a detailed component and the base component, having the steps of extracting the base component by application of an edge preserving filter to the image data, and correcting the extracted base component corresponding to a predetermined frequency component of the image data.

The embodiments of the present invention may be further attained by an image processing apparatus for extracting a base component from image data including a detailed component and the base component having a detecting section for detecting a frequency component of the image data, and an extracting section for extracting the base component through application of an edge presenting filter conforming to the frequency component having been detected.

Further, an embodiment of the present invention may be attained by an image processing method having the steps of removing a noise component through application of an edge preserving filter to image data, and correcting the image data from which the noise component corresponding to a predetermined frequency component of the image data prior to removal of the noise component has been removed.

The invention itself together with further features and attendant advanages, will best be understood by reference to the following detailed description taken in conjunction with the accompanying drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

In the following description, like parts are designated by like reference numbers throughout the several drawings.

DESCRIPTION OF THE PREFERRED EMBODIMENT

The following describes the details of the embodiment according to the present invention with reference to drawings:

Embodiment 1

Figure 1:
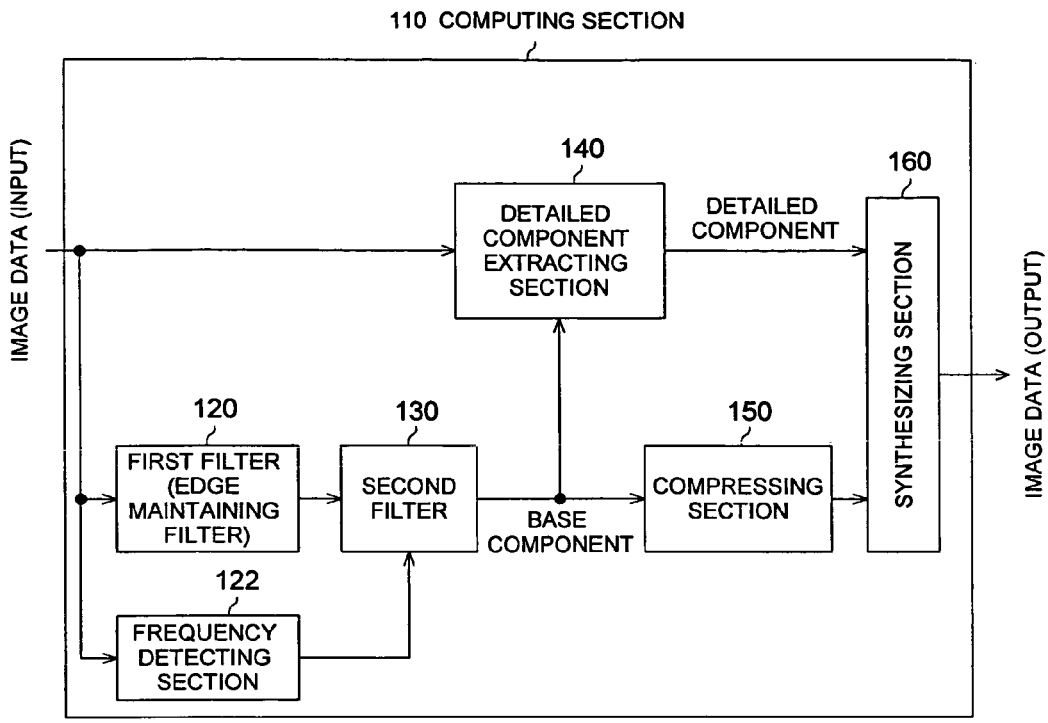
FIG. 1 is a block diagram representing a structure of the image processing section as a first embodiment.
Figure 2:
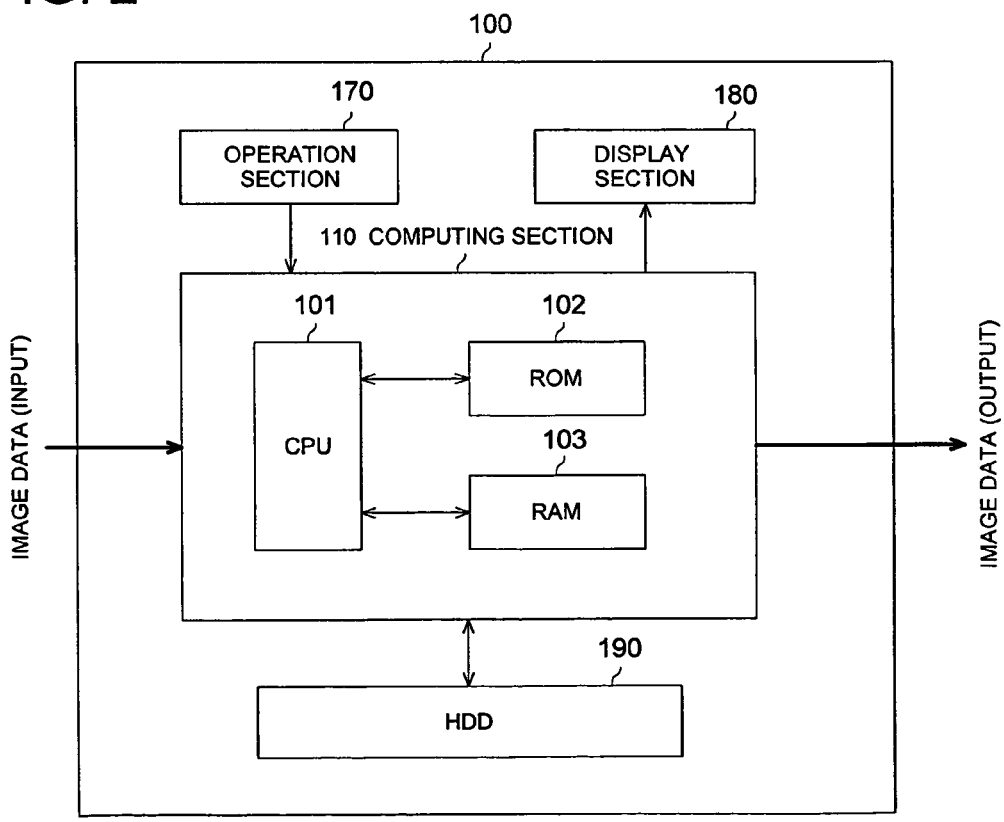
FIG. 2 is a block diagram representing the structure of the image processing apparatus.

FIG. 1 is a functional block diagram representing the functional structure of the major section of the image processing section (hereinafter referred to as "computing section"). FIG. 2 is a block diagram representing the specific circuits and apparatuses constituting the image processing apparatus.

Reference numeral 110 denotes a computing section for performing computation operations for image processing in the image processing apparatus 100 (FIG. 2). The computing section 110 performs the computation operation for separating the detailed component contained in the image data from the base component for shifting the signal value of the detailed component a certain amount, in the image processing apparatus 100, and synthesizing them again into image data, subsequent to application of the processing adequate to each of them.

The computing section 110 is structured in such a way as to ensure that the original edge portion is correctly preserved and the base component is extracted, independently of whether the edge of the base component contained in the image data is subjected to abrupt or gradual changes. The computing section 110 functionally contains at least a first filter (hereinafter also referred to as "edge preserving filter")

120, second filter 130, detailed component extracting section 140, compressing section 150 and synthesizing section 160.

Numeral 120 denotes a first filter made up of the edge preserving filter and the like. The base component is extracted using the edge preserving filter capable of extracting the base component, while preserving the edge portion of the image data. This first filter 120 performs filter processing for extracting the low frequency component for detecting the signal value of the base component of the image data and the high frequency component for detecting the edge portion of the base component.

Numeral 122 denotes a frequency detecting section for detecting the frequency component of each pixel. The frequency detecting section 122 detects to check whether or not the image data contains an intermediate component in the position between the low frequency component for extracting the base component and the high frequency component for extracting the edge portion of the base component.

Numeral 130 indicates a second filter for working on the base component extracted by the edge preserving filter 120 and performing the filter processing to remove the portion incorrectly detected by the edge preserving filter 120. When the image data contains the intermediate component in the position between the low frequency component for extracting the base component and the high frequency component for extracting the edge portion of the base component, the second filter 130 performs filtering operation to smoothen the base component extracted by the edge preserving filter.

Numeral 140 indicates the detailed component extracting section for extracting the detailed component from the image data, by either subtracting the base component contained in the image data having been inputted from the image data or dividing the image data by the base component contained in the image data having been inputted. The detailed component in the sense in which it is used here refers to the component that varies on a step-by-step basis as compared with that of the peripheral pixel, and is mainly made up of high frequency components.

Numeral 150 indicates the compressing section for compressing the signal value of the base component at a certain rate, the base component having been extracted by the second filter 130 or the like.

Numeral 160 indicates the synthesizing section for synthesizing the compressed base component and detailed component. When subtraction has been performed in the detailed component extracting section 140, the synthesizing section 160 performs synthesis by addition of the base component to the detailed component. When the division has been performed in the detailed component extracting section 140, the synthesizing section 160 performs synthesis by multiplication between the base component and detailed component. Since the detailed component is not compressed although the base component having a greater amplitude of signal value is compressed, image data is outputted from this synthesizing section 160 without the subtle delineation of the image being damaged, although the portion pertaining to brightness of the image is compressed.

In FIG. 2, the image processing apparatus 100 has the following as hardware:

The computing section 110 whose functional structure is shown in FIG. 1 contains a CPU 101 as a control means for controlling various sections; a ROM 102 storing various forms of data and programs; and a RAM 103 providing an area where image data is displayed and processed.

Numeral 170 indicates the operation section for the operator (user) to input various instructions into the image processing apparatus 100. Numeral 180 denotes the display section for displaying various states of the image processing apparatus 100. Numeral 190 indicates the HDD storing image data and other forms of data.

Figure 3:
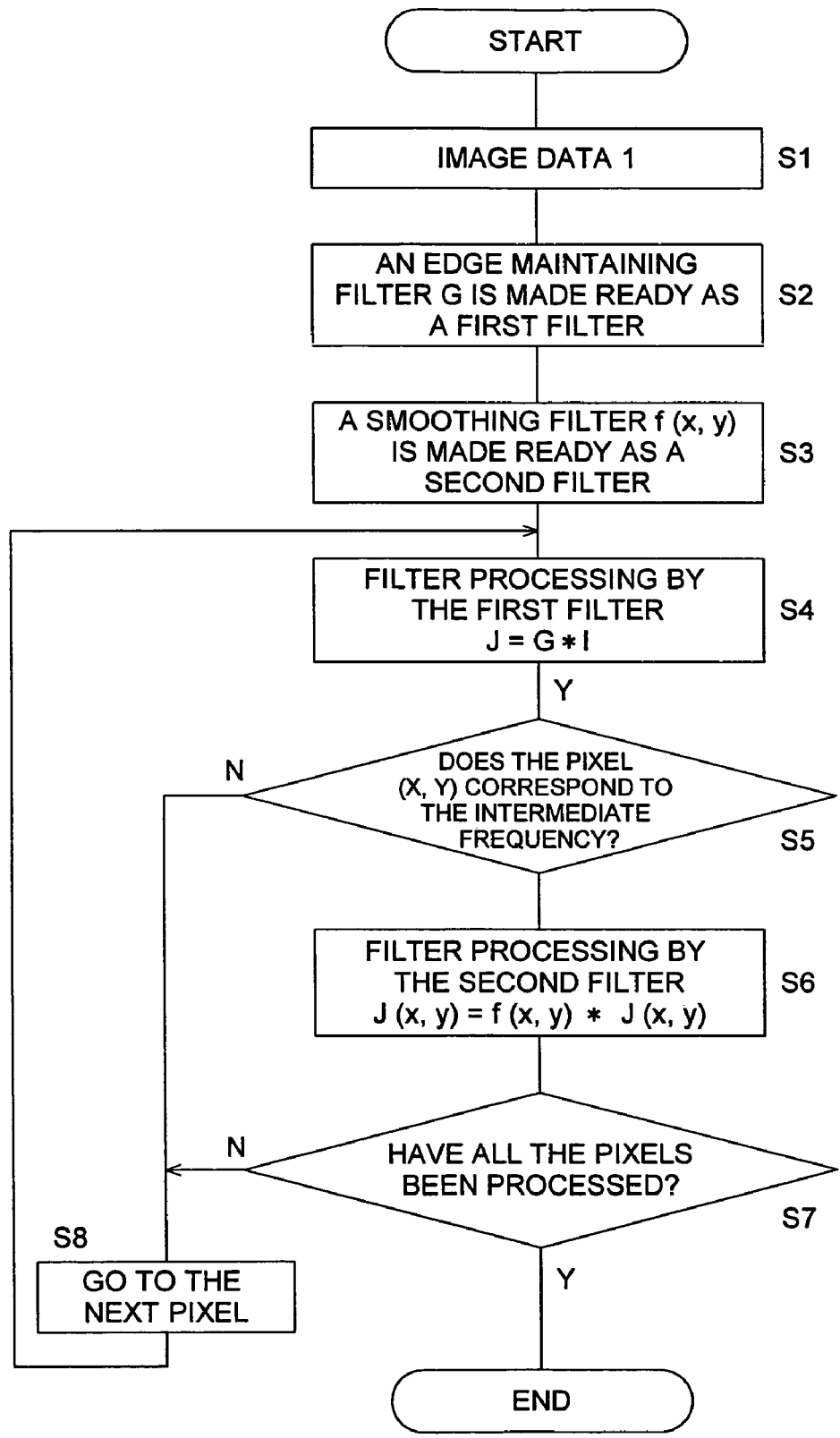
FIG. 3 is a flow chart representing the operation of the image processing section.

The following describes the operation of the image processing apparatus 100 as the first embodiment with reference to the flow chart (FIG. 3).

In the first place, image data I is inputted into the computing section 110 of the image processing apparatus 100 (S1). Then edge preserving filter G is made read for use as the first filter 120 (S2). A smoothing filter f (x, y) is made read for use as the second filter 130 (S3). When the CPU 101 performs image processing according to the image processing program, the CPU 101 prepares an edge preserving filter G as the first filter 120, according to the parameter stored in the ROM 102. Similarly, the CPU 101 prepares a smoothing filter f as the second filter 130.

The first filter 120 applies the process of filtering (J=G*I) to the image data (S4), and the base component J contained in the image data is extracted by the edge preserving filter.

Figure 4:
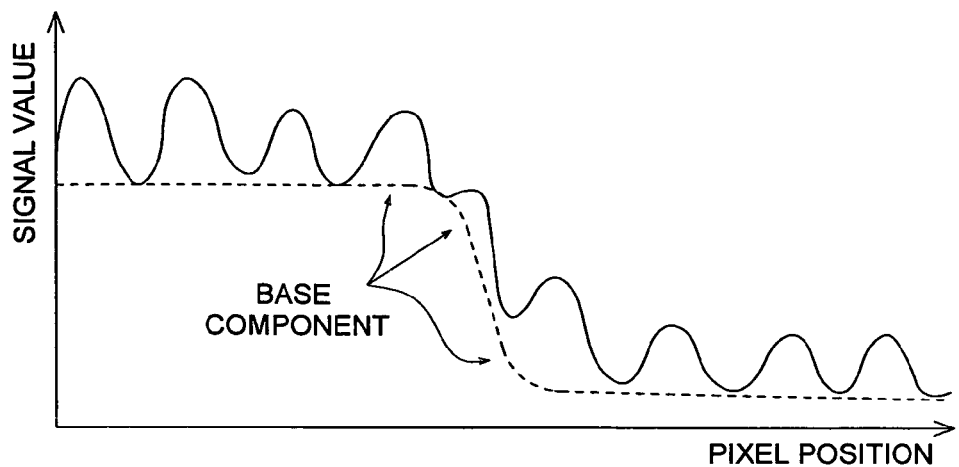
FIGS. 4(a), (b) and (c) are characteristic diagrams for image data processing carried out in the image processing section.
Figure 4:
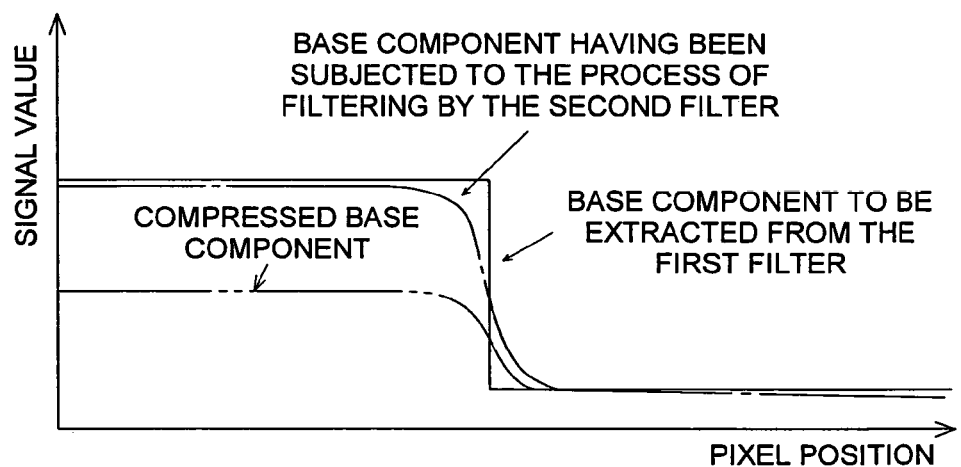
Figure 4:
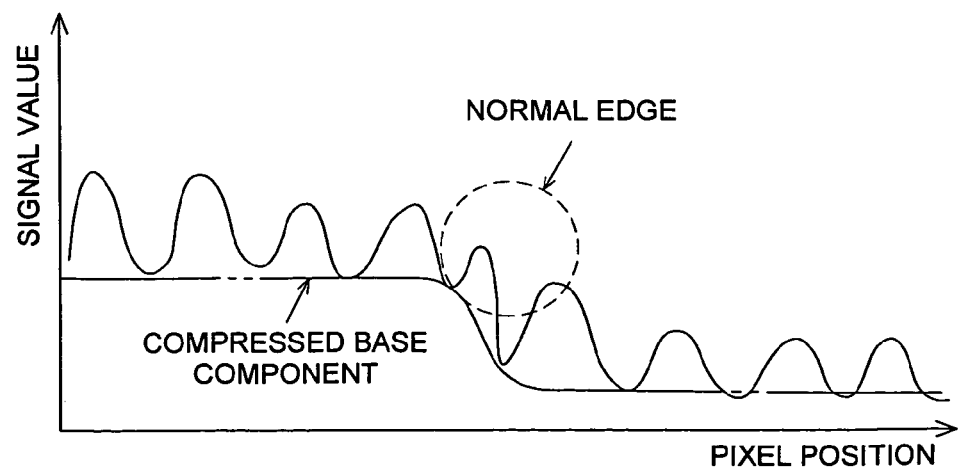

When the original base component exhibits a smooth transition as shown by the broken line of FIG. 4(a), the smooth portion (wavy line of FIG. 4(a)) included in the original base component will be adversely affected by the intermediate through high frequency component included in the detailed component, and a detection error will occur, if the edge preserving filter is used to extract the base component. It will be detected as a base component having the waveform wherein the signal value is subjected to abrupt changes (solid line of FIG. 4(b)).

Figure 5:
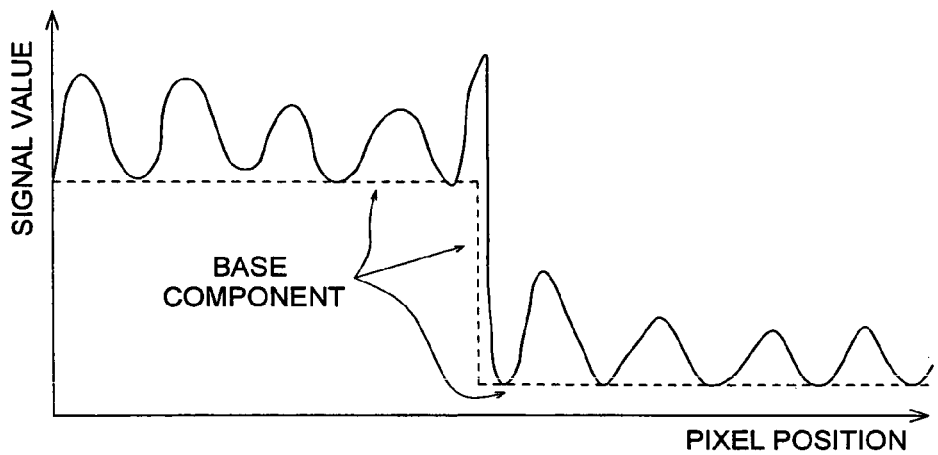
FIGS. 5(a), (b) and (c) are characteristic diagrams for image data processing carried out in the image processing section.
Figure 5:
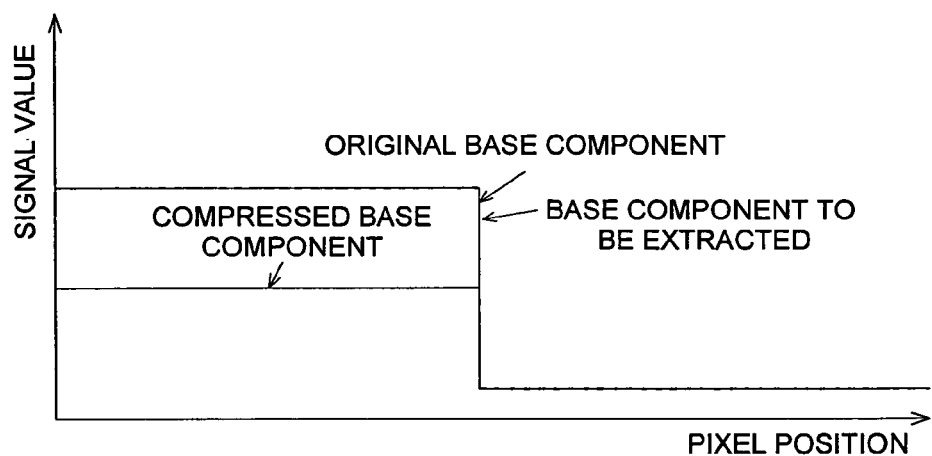
Figure 5:
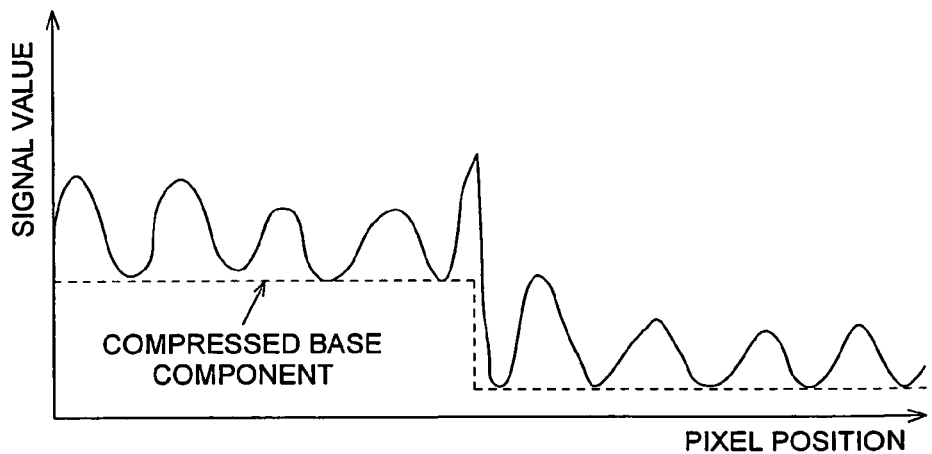

When the original base component exhibits a abrupt transition as shown by the broken line of FIG. 5(a), the base component of the waveform conforming to the original base component (wavy line of FIG. 4(a)) will be extracted (solid line of FIG. 5(b)), if the edge preserving filter is used to extract the base component.

The frequency component of the pixel for which the base component has been extracted using the edge preserving filter as the first filter 120 is detected by the frequency detecting section 122 (S5). The frequency component of the pixel refers to the frequency component produced by the difference with the signal value of the peripheral pixel.

Figure 16:
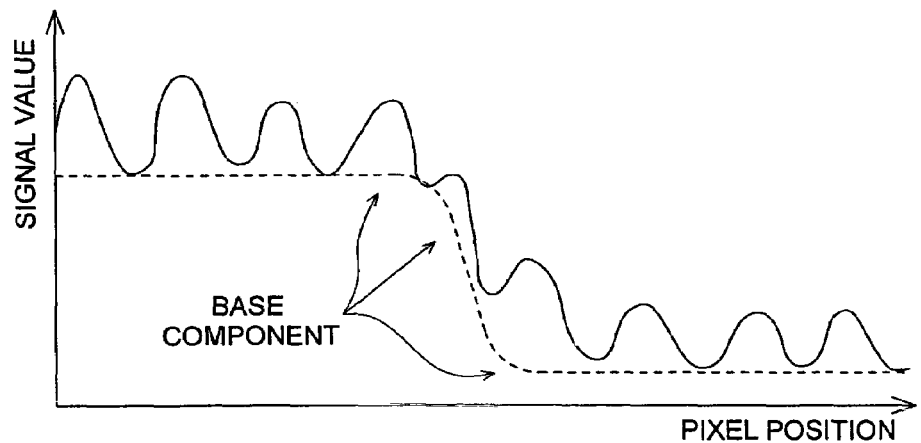
FIGS. 16(a), (b) and (c) are characteristic diagrams for extracting the base component using an edge preserving filter in conventional image processing.
Figure 16:
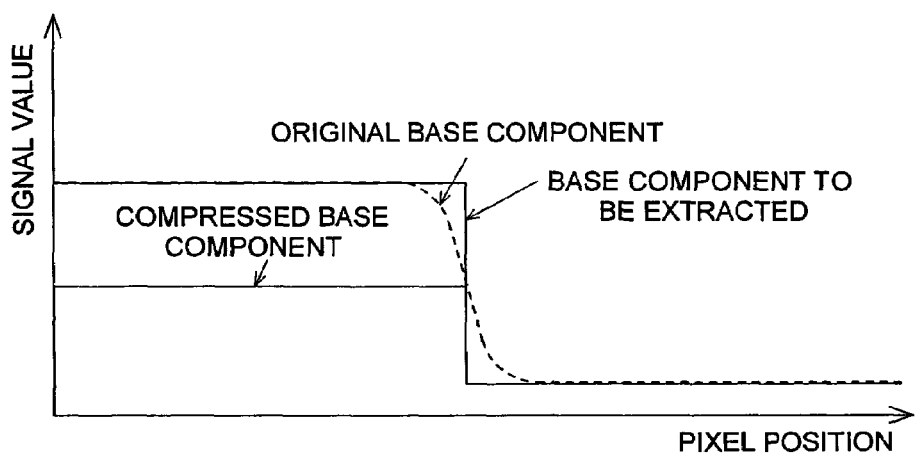
Figure 16:
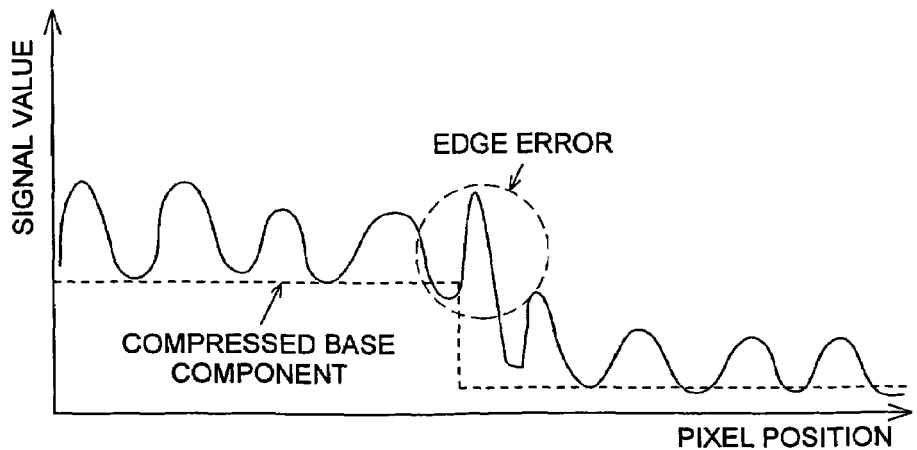

The edge preserving filter applies processing in such a way that the portion over a certain level of frequency will be identified as the edge portion. Thus, not only the high frequency component corresponding to the original edge portion but also the intermediate frequency component are processed after being identified as an edge portion. The present inventors have found out that the detection error shown in FIG. 16 occurs in the intermediate frequency component.

The frequency detecting section 122 detects to check whether or not the image data contains an intermediate frequency component in the position between the low frequency component for extracting the base component and the high frequency component for extracting the edge portion of the base component.

If the pixel having been subjected to processing by the edge preserving filter as the first filter 120 is the intermediate frequency component (Y in S5), then the base component is smoothed (J=f (x, y)*J (x, y) by the smoothing filter f of the second filter 130, in the smoothing filter processing by the second filter 130, whereby a new base component J is obtained (S6).

If the pixel having been subjected to processing by the first filter 120 is not an intermediate frequency component (N in S5), then processing by the edge preserving filter as the first filter 120 goes to the next pixel (S8 and S4).

In the case of extraction of the base component by the edge preserving filter as the first filter 120, frequency detection and intermediate frequency component for all the pixels, the smoothing filter processing of the second filter 130 will be implemented (S7).

If the base component is detected as a base component having the waveform wherein the signal value is subjected to abrupt change due to detection error of the edge preserving filter (solid line of FIG. 4(b)), although the original base component exhibits a gradual transition as shown by the broken line of FIG. 4(a), the process of smoothing is carried out by the second filter 130 when the intermediate frequency component has been detected in the image data. Thus, a smooth base component indicated by the one-dot chain line of FIG. 4(b) is obtained. The smooth base component indicated by the one-dot chain line of FIG. 4(b) almost agrees with the original base component shown by the broken line of FIG. 4(a).

To put it another way, the accurate detailed component can be obtained by either subtraction of the base component from the image data performed by the detailed-component extracting section 140, using a new base component resulting from the smoothing filter processing of the second filter 130, or division of the image data by the base component.

A new base component resulting from the smoothing filter processing of the second filter 130 is compressed by the compressing section 150 (two-dot chain line of FIG. 4(b)), and is synthesized by the synthesizing section 160 through addition or multiplication of the detailed component and base component. Then the image data conforming to the smooth edge portion will be obtained, as shown in FIG. 4(c). To put it another way, an edge error shown in FIG. 16 will not occur.

Assume that the original base component has an edge portion exhibiting an abrupt transition as shown by the broken line of FIG. 5(a). Then the base component having the waveform wherein the signal value exhibits an abrupt transition can be detected by the edge preserving filter (solid line of FIG. 5(b)).

In the case of the edge portion exhibiting an abrupt transition, the image data is made of high frequency component—not an intermediate frequency component. Accordingly, the intermediate frequency component is not detected by the frequency detecting section 122. This arrangement provides the base component having an abrupt edge portion shown by the solid line of FIG. 5(b), without smoothing filter processing being carried out by the second filter 130. The base component shown by the solid line of FIG. 5(b) is almost the same as the original base component shown by the broken line of FIG. 5(a).

To be more specific, an accurate detailed component is obtained by either subtraction of the base component from the image data by the detailed component extracting section 140 using the normal base component without smoothing filter processing being carried out by the second filter 130, or division of the image data by the base component.

The image data conforming to the abrupt edge portion shown in FIG. 5(c) can be obtained by compression of the base component by the compressing section 150 (solid line of FIG. 5(b)) and synthesis by addition or multiplication of the detailed component and base component by the synthesizing section 160. Thus, the smoothing filter processing by the second filter 130 does not give any adverse effect.

As described above, when the base component contained in the image data is to be extracted, the original edge portion is correctly preserved and the base component is extracted, independently of whether the edge of the base component exhibits an abrupt or gradual change.

Figure 6:
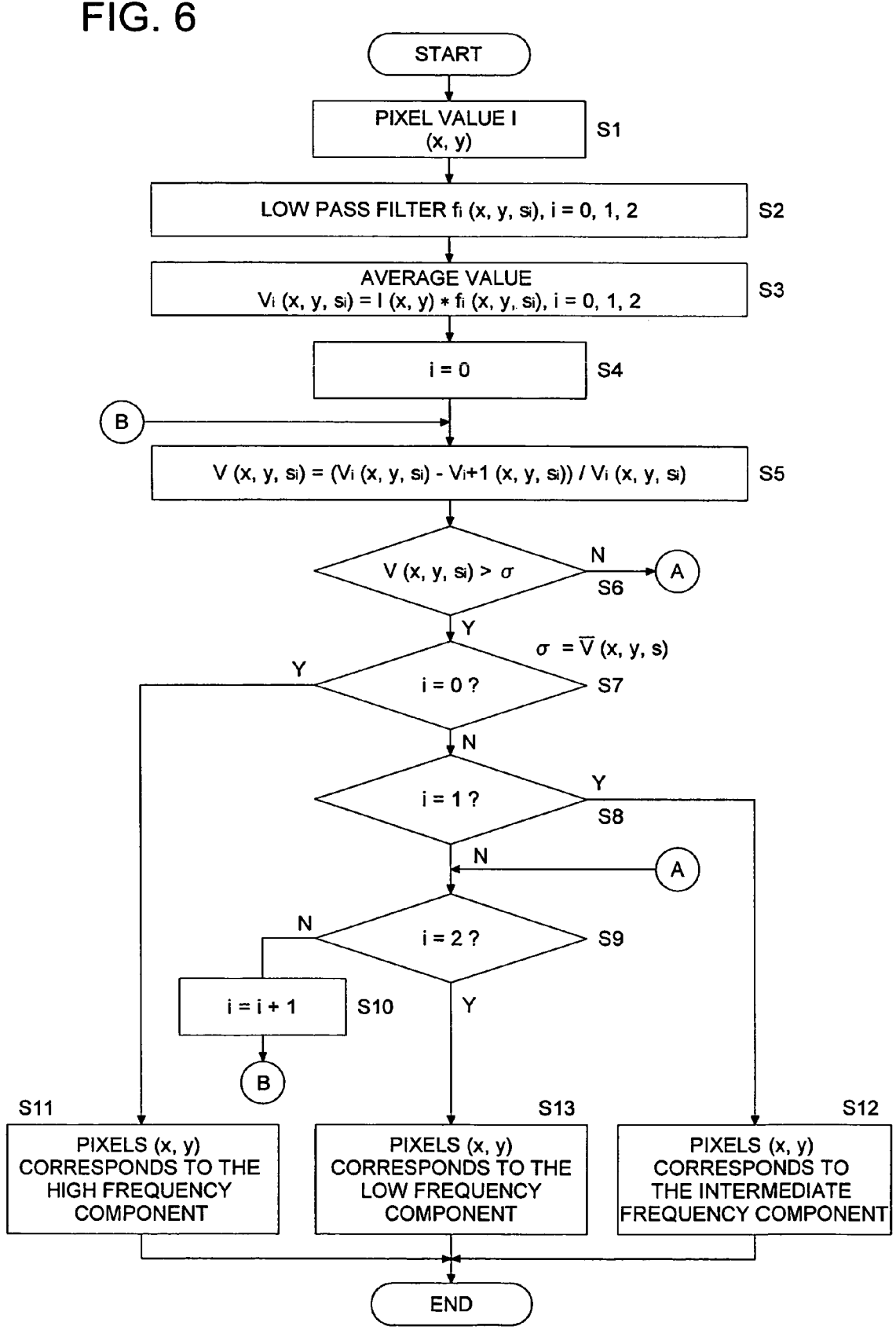
FIG. 6 is a flow chart representing the operation for detecting the intermediate frequency component in the image processing section.

FIG. 6 is a flow chart representing the operation for detecting the intermediate frequency component in the frequency detecting section 122, in the aforementioned case. Here, the low through high frequency components are also detected for identification.

The frequency component can be identified according to the change in contrast of each pixel with the peripheral pixels. To be more specific, the frequency component can be detected according to the range in which a difference in contrast will occur, when a relevant pixel contains the peripheral pixels.

A plurality of low-pass filter fi (x, y, si), i=0, 1, 2 having different sizes are made ready, with the relevant pixel as a center containing peripheral pixels (S2). To distinguish among the three components—high, intermediate and low components, the smallest filter i=0 is used for high frequency component, the second smallest filter i=1 for intermediate frequency component, and the largest filter i=2 is used for low frequency component.

The number of the peripheral pixels to be used in practice should be determined according to the relationship between the space frequency and the intermediate frequency to be detected, wherein this space frequency is determined according to the number of the pixels of the image data and the resolution thereof. The low through high frequency components should be determined according to the intermediate frequency component.

The average value Vi (x, y, si)=I (x, y)*fi (x, y, si), i=0, 1, 2 is obtained by these low pass filters (S3).

Then the difference V (x, y, si) of the average values of the adjacent area is calculated (S5). The difference V (x, y, si) of the average values of the adjacent area is compared with the threshold value σ (S6). To avoid lack of balance in the step of decision, the threshold value is set to the average σ of the differences of the average values in the adjacent area for all pixels.

Calculation of the difference V (x, y, si) of the average values of the adjacent area (S5) and comparison between the difference V (x, y, si) of the average values of the adjacent area and threshold value a (S6) are performed sequentially starting from i=0 (S4 through S9).

For example, of the three areas having different sizes, the largest area is determined as the low frequency area, the second largest area is determined as the low frequency area, and the smallest area is determined as the low frequency area.

Here, if the difference V (x, y, si) of the average values of the adjacent area is greater than σ (Y in S6) and i=0 (Y in S7), the pixel (x, y) is determined as the high frequency component (S11).

If i=0 (S4) and the difference V (x, y, si) of the average values of the adjacent area is smaller than σ (N in S6), i=i+1 (S10) and the system goes back to S5. When i=1, the difference V (x, y, si) of the average values of the adjacent area is calculated (S5) and comparison is made between the difference V (x, y, si) of the average values of the adjacent area and threshold value σ (S6).

If i=0 (S4) and the difference V (x, y, si) of the average values of the adjacent area is greater than σ (Y in S6) and i=1 (Y in S8), the pixel (x, y) is determined as the intermediate frequency component (S12).

If i=1 and the difference V (x, y, si) of the average values of the adjacent area is smaller than σ (N in S6), i=i+1 (S10) to yield i=2, and the system goes back to S5. When i=2, the difference V (x, y, si) of the average values of the adjacent area is calculated (S5) and comparison is made between the difference V (x, y, si) of the average values of the adjacent area and threshold value σ (S6).

If i=2 and the difference V (x, y, si) of the average values of the adjacent area is greater than σ (Y in S6), i=2 (N in S7, N in S8 and Y in S9). The pixel (x, y) is determined as a low frequency component (S13). Even if i=2 and the difference V (x, y, si) of the average values of the adjacent area is smaller than σ (N in S6), i=2 (Y in S9). The pixel (x, y) is determined as a low frequency component (S13) in the same manner.

As described above, when the relevant pixel contains peripheral pixels, the following distinction is made;

a high frequency component wherein a difference in contract occurs in the smaller range in the vicinity a low frequency component wherein a difference in contract occurs in the larger range an intermediate frequency component wherein a difference in contract occurs in the range intermediate between these two. This procedure ensures accurate detection of the intermediate frequency component.

As a result of the discussion, it has been made clear that, when extracting the base component from the image data, the intermediate frequency component contained in the image data can be accurately detected and the smoothing filter processing by the second filter 130 can be implemented. This arrangement allows the original edge portion to be correctly preserved and permits the base component to be extracted, independently of whether the edge of the base component exhibits an abrupt or gradual change.

Embodiment 2

Figure 7:
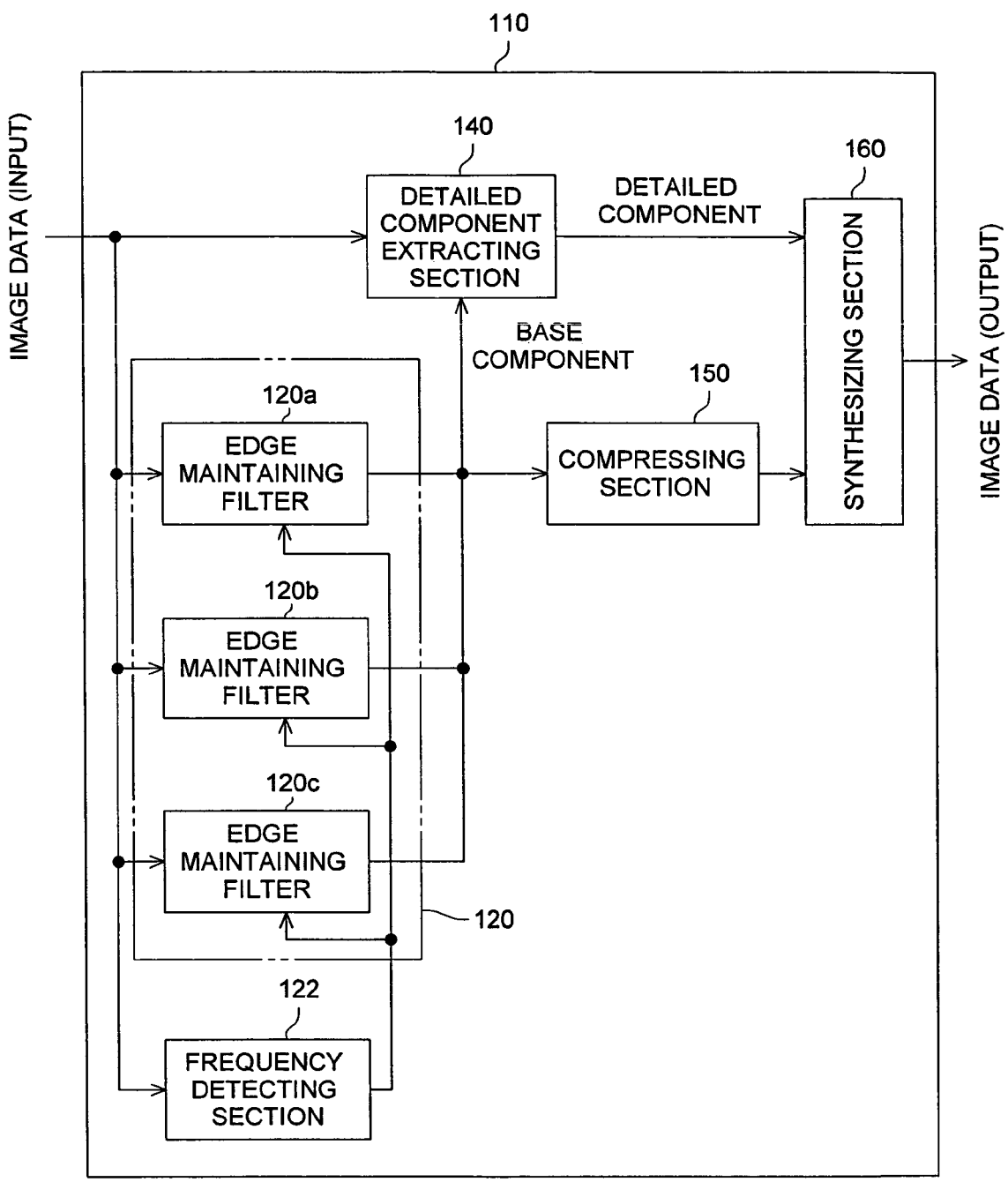
FIG. 7 is a block diagram representing a structure of the image processing section as a second embodiment.
Figure 8:
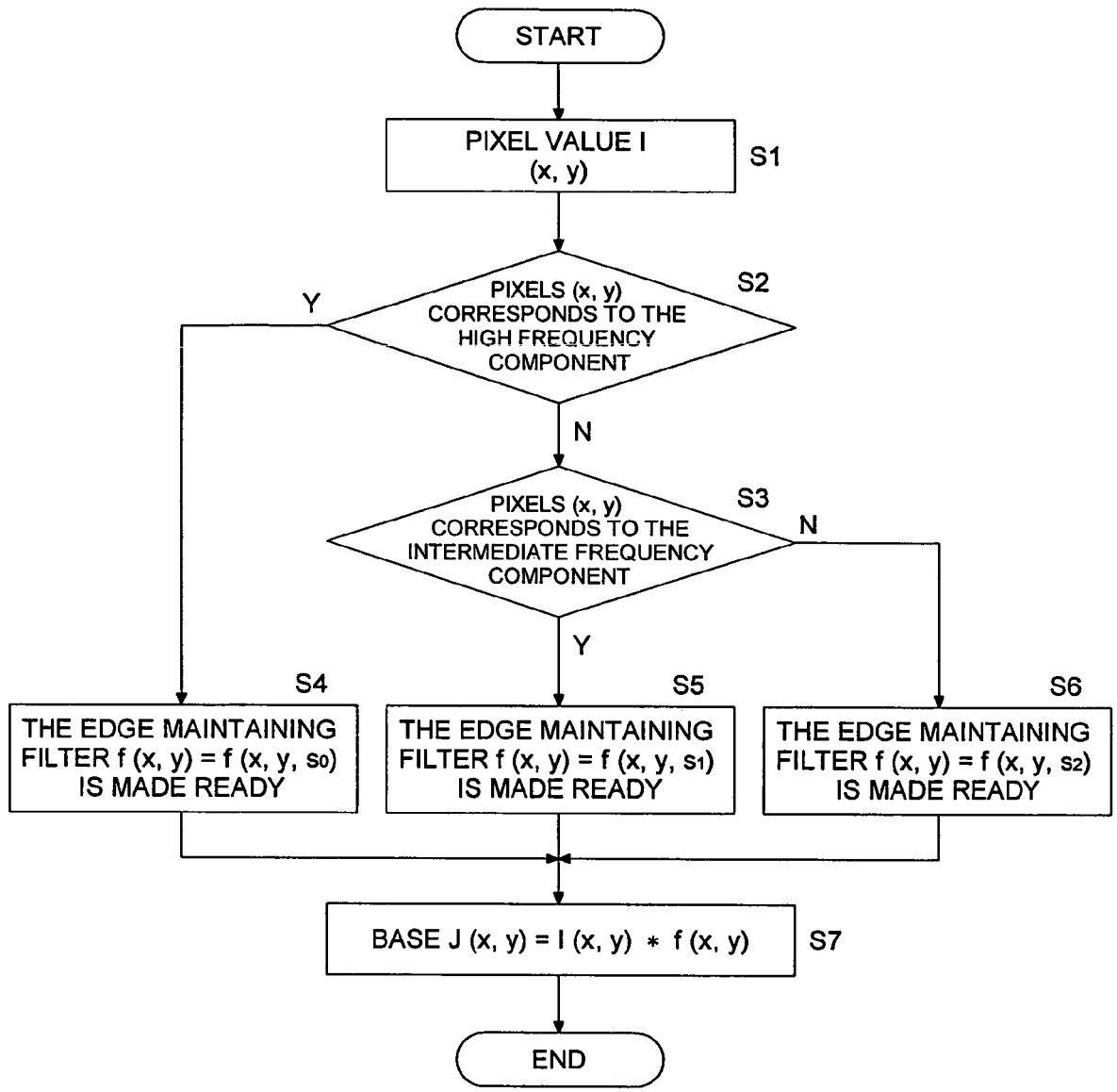
FIG. 8 is a flow chart representing the operation of the image processing section.

Referring to FIG. 7 and thereafter, the following describes the second embodiment:

The second embodiment refers to the case of an edge preserving filter capable of extracting the base component with the image edge preserved, wherein the filter size is determined in conformity to the frequency component for each pixel detected by the frequency detecting section 122 in such a way that a smaller filter size is determined for the frequency component on the high frequency side, and a greater filter size is determined for the frequency component on the low frequency side, thereby extracting the base component by the edge preserving filter of the determined size.

FIG. 7 is a block diagram representing the functional structure of the major portion of the image processing section.

Numeral 110 indicates a computing section for executing image processing in the image processing apparatus 100 (FIG. 2). In the image processing apparatus 100, this computing section 110 separates the detailed component contained in the image data, from the base component for shifting the signal value of the detailed component a certain amount, and synthesizes them again subsequent to processing applied to each of them, whereby image data is formed.

This computing section 110 allows the edge portion to be correctly preserved and permits the base component to be extracted, independently of whether the edge of the base component exhibits an abrupt or gradual change.

In terms of functions, the computing section 110 contains at least the first filter 120, frequency detecting section 122, detailed component extracting section 140, compressing section 150 and synthesizing section 160. The first filter 120 contains a plurality of filters having different characteristics, which are the edge preserving filters 120a through 120c.

Numeral 120 is a first filter made up of edge preserving filters, using the edge preserving filter capable of extracting the base component while preserving the edge portion of the image, the first filter 120 extracts the base component. Using each edge preserving filter, this first filter 120 provides filter processing to extract the low frequency component for detecting the area wherein the signal value of the base component of the image data is constant, and the high frequency component for detecting the edge portion of the base component.

Each edge preserving filter detects the edge portion contained in the image data having different characteristics, for example, through filtering operation using the filters having different sizes. Accordingly, it extracts the high frequency component having different frequencies. In this case, any one of a plurality of edge preserving filters 120a through 120c becomes active, as a result of detecting the frequency detecting section 122 to be described later.

Numeral 122 denotes a frequency detecting section for detecting the frequency component of each pixel. The frequency detecting section 122 detects to check the state of the frequency characteristics when the edge preserving filter is used. The details of the frequency detecting section 122 are the same as those described with reference to the first embodiment.

Numeral 140 indicates the detailed component extracting section for extracting the detailed component from the image data, by either subtracting the base component contained in the image data having been inputted from the image data or dividing the image data by the base component contained in the image data having been inputted. The detailed component in the sense in which it is used here refers to the component that varies on a step-by-step basis as compared with that of the peripheral pixel, and is mainly made up of high frequency components.

Numeral 150 indicates the compressing section for compressing the signal value of the base component at a certain rate, the base component having been extracted by the second filter 130 or the like.

Numeral 160 indicates the synthesizing section for synthesizing the compressed base component and detailed component. When subtraction has been performed in the detailed component extracting section 140, the synthesizing section 160 performs synthesis by addition of the base component to the detailed component. When the division has been performed in the detailed component extracting section 140, the synthesizing section 160 performs synthesis by multiplication between the base component and detailed component. Since the detailed component is not compressed although the base component having a greater amplitude of signal value is compressed, image data is outputted from this synthesizing section 160 without the subtle delineation of the image being damaged, although the portion pertaining to brightness of the image is compressed.

The following describes the operation of the image processing apparatus 100: It is assumed that f (x, y, s0) is made ready for use as the edge preserving filter 120a, f (x, y, s1) is made ready for use as the edge preserving filter 120b, and f (x, y, s2) is made ready for use as the edge preserving filter 120c.

The image data I of the pixel value I (x, y) is inputted in the computing section 110 of the image processing apparatus 100 (S1).

To determine which one of a plurality of edge preserving filters should be used by the first filter 120 to extract the base component, the frequency detecting section 122 performs processing of detection for the frequency component of the particular pixel (S2, S3). The frequency component of the pixel in the sense in which it is used here refers to the frequency component produced by the difference from the signal values of the peripheral pixels.

Any one out of the edge preserving filters having different characteristics is selected in conformity to the frequency component of the pixel, and is activated, whereby the base component is extracted.

To be more specific, if the frequency component of the pixel is a high frequency component (Y in S2), then f (x, y, s0) is selected as the edge preserving filter f (x, y) (S4). If the frequency component of the pixel is an intermediate high frequency component (N in S2 and Y in S3), then f (x, y, s1) is selected as the edge preserving filter f (x, y) (S5). If the frequency component of the pixel is neither a high frequency component nor an intermediate frequency component (N in S2 and N in S3), then f (x, y, s2) is selected as the edge preserving filter f (x, y) (S6).

Each edge preserving filter identifies the edge portion according to the different frequency characteristics and extracts the base component.

For example, the following should be made ready for use: an edge preserving filter for detecting the high frequency component as the edge portion in order to conform to the abruptly changing edge portion, an edge preserving filter for detecting the slightly lower frequency component or intermediate frequency component as the edge portion in order to conform to the gradually changing edge portion, and an edge preserving filter for detecting the low frequency component as the edge portion in order to conform to the more gradually changing edge portion.

The difference in characteristics of such edge preserving filters can be achieved by the difference in filter sizes, as will be described later.

Filter processing (J (x, y)=I (x, y)*f (x, y)) of the image data is implemented by the first filter 120 (S7). The base component J contained in the image data is extracted by the edge preserving filter selected to conform to the frequency component.

In the manner described above, an edge preserving filter is selected in conformity to the frequency component for each of all the pixels, and the base component J contained in the image data is extracted by the selected edge preserving filter.

This results in a change of the frequency characteristics for identifying the edge portion as an edge in conformity to the frequency component of the pixel. When the base component contained in the image data is to be extracted, a filter is selected in conformity to the change, independently of whether the edge of the base component exhibits an abrupt, gradual or very gradual change. This ensures that the edge portion is correctly preserved and the base component is extracted.

To be more specific, if the frequency component of the pixel is lower, an edge preserving filter conforming to the lower frequency is selected. This reduces the possibility of detection error due to the detailed component. If the frequency component of the pixel is higher, an edge preserving filter conforming to the higher frequency is selected. This ensures an accurate detection of the abruptly changing edge portion. If the frequency component of the pixel is intermediate, an edge preserving filter conforming to the intermediate frequency is selected. This ensures an accurate detection of the gradually changing edge portion.

In the second embodiment described above, three edge preserving filters 120a, 120b and 120c have been used. However, two or edge preserving filters can be used. Further, four or more edge preserving filters can also be employed.

Each edge preserving filter is only required to detect the edge portion conforming to a predetermined frequency component. This arrangement does not require undue expansion of the range of the frequency component to be identified as an edge. Accordingly, there is no need of providing extra characteristics that may cause a detection error due to the detailed component (high frequency component) as in the conventional method. Thus, this arrangement further improves accuracy.

Figure 9:
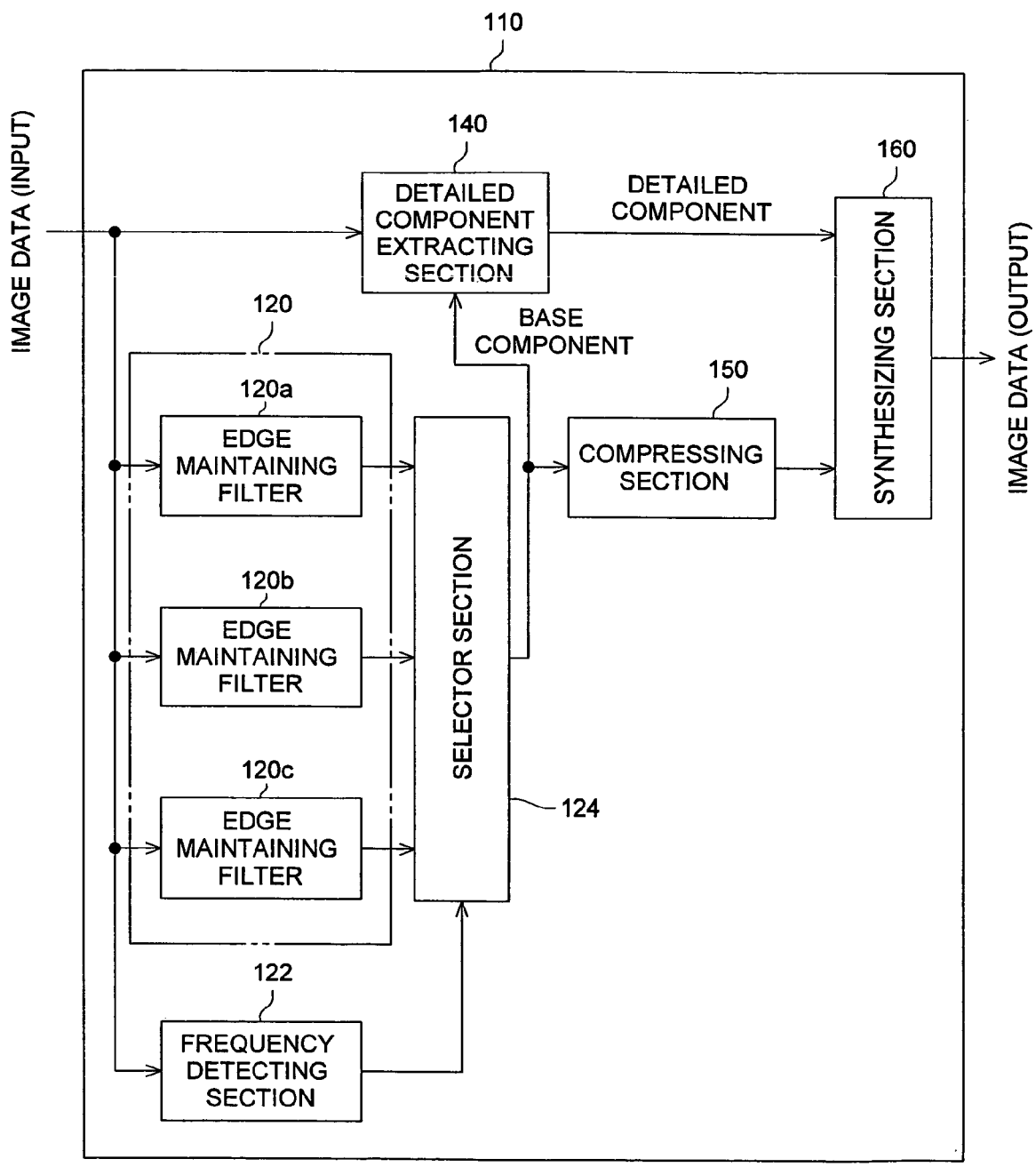
FIG. 9 is a block diagram representing another structure of the image processing section as a second embodiment.

In the FIG. 7, any one of the edge preserving filters 120a through 120c is activated in conformity to the result of detection by the frequency detecting section 122. It is also possible to make such arrangements that the output of any one of the edge preserving filters 120a through 120c is produced after having been selected by the selector section 124, in conformity to the result of the detection by the frequency detecting section 122, as shown in FIG. 9.

Figure 10:
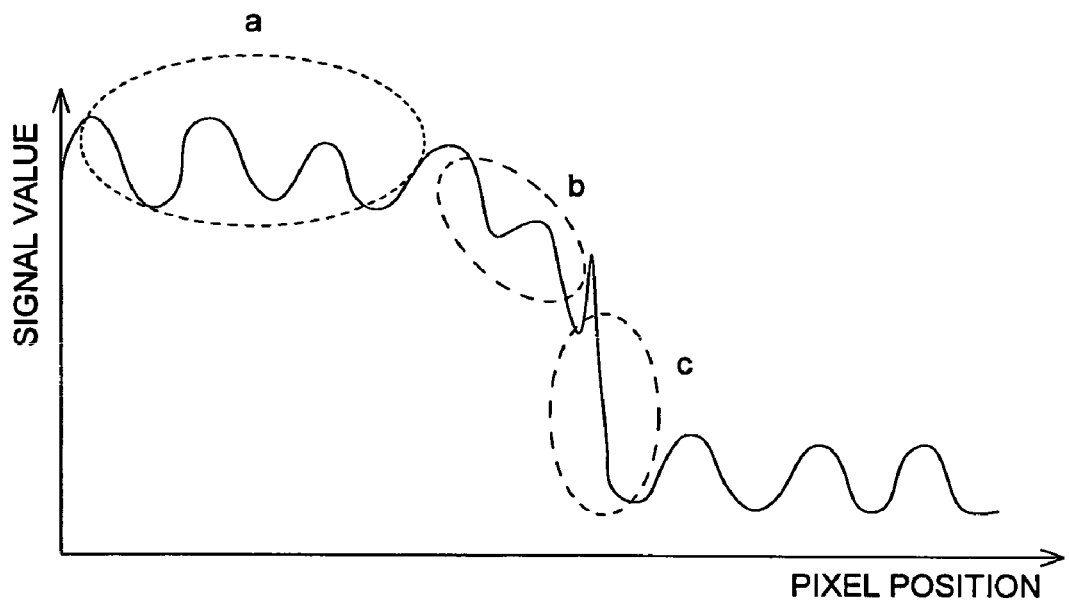
FIGS. 10(a) and (b) are characteristic diagrams for image data processing carried out in the image processing section.
Figure 10:
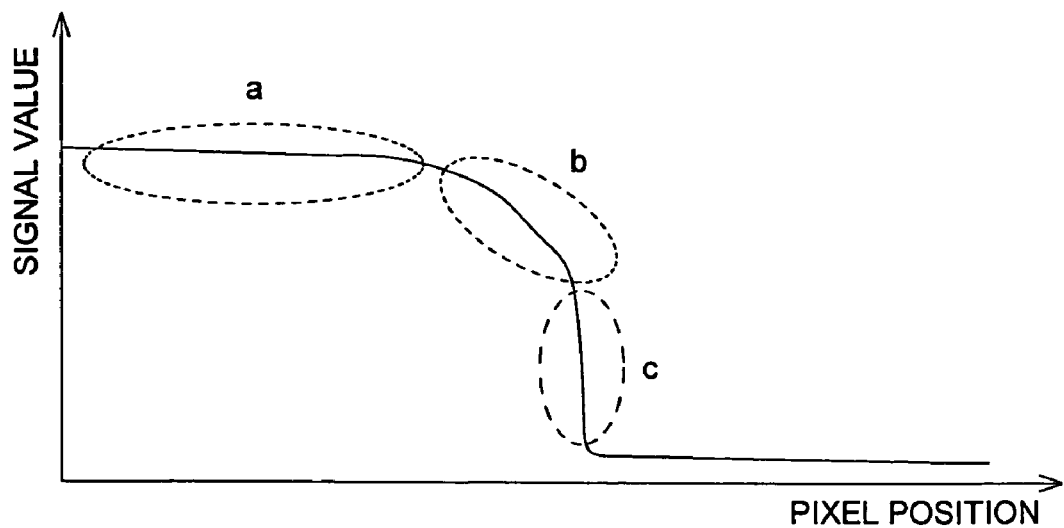

Assume that the waveform of the signal value of the image data is as shown in FIG. 10(a). In the pixel within the range a in FIG. 10(a), the low frequency component is detected by the frequency detecting section 122. This allows an edge preserving filter conforming to the low-frequency component to be selected; hence allows a flat or gradually changing base component to be extracted, as shown in the range a of FIG. 10(b).

For the pixel of the range b of FIG. 10(a), the intermediate frequency component is extracted by the frequency detecting section 122. Accordingly, the edge preserving filter conforming to the intermediate frequency component is selected. This arrangement ensures gradually changing base component to be extracted, as shown in the range b of FIG. 10(b), without being accompanied by a detection error of the edge portion.

For the pixel of the range c of FIG. 10(a), the higher frequency component is extracted by the frequency detecting section 122. Accordingly, the edge preserving filter conforming to the high frequency component is selected. This arrangement ensures the abruptly changing base component to be extracted, as shown in the range c of FIG. 10(b), without a waveform becoming blunt.

The accurate detailed component can be obtained by either subtraction of the base component from the image data performed by the detailed component extracting section 140, using a normal base component generated by the selection from a plurality of edge preserving filters, or division of the image data by the base component.

The base component generated by the selection from a plurality of edge preserving filters is compressed by the compressing section 150, and is synthesized by the synthesizing section 160 through addition or multiplication of the detailed component and base component. This procedure yields a desired form of image data. To put it another way, an edge error shown in FIG. 16 will not occur.

The aforementioned arrangement causes a change in the frequency characteristics in identifying the edge portion as an edge conforming to the frequency component of the pixel. In the extraction of the base component from the image data, independently of whether the edge of the base component exhibits an abrupt or gradual change, this arrangement ensures that a proper filter is selected in conformity to the change and the base component is extracted with the edge portion correctly preserved.

In the second embodiment, a plurality of edge preserving filters made ready in advance can be used on a selective basis, or the image data is pre-scanned to check the distribution of the frequency component, and a plurality of adequate edge preserving filters can be created in conformity to the result of this check.

Embodiment 3

In the description of the second embodiment, the filter size is determined in response to the frequency component for each pixel having been detected in such a way that the filter size is reduced for the higher frequency component and is increased for the lower frequency component. The base component is extracted using the edge preserving filter of the size having been determined. As shown in FIGS. 7 and 9, a plurality of edge preserving filters are made ready and selection was made at the time of filtering, according to the description of the second embodiment. It is also possible to produce a variation of this second embodiment, in such a way that an edge preserving filter of the size conforming to the frequency component of the pixel is generated or formed by modification, wherever required.

Figure 11:
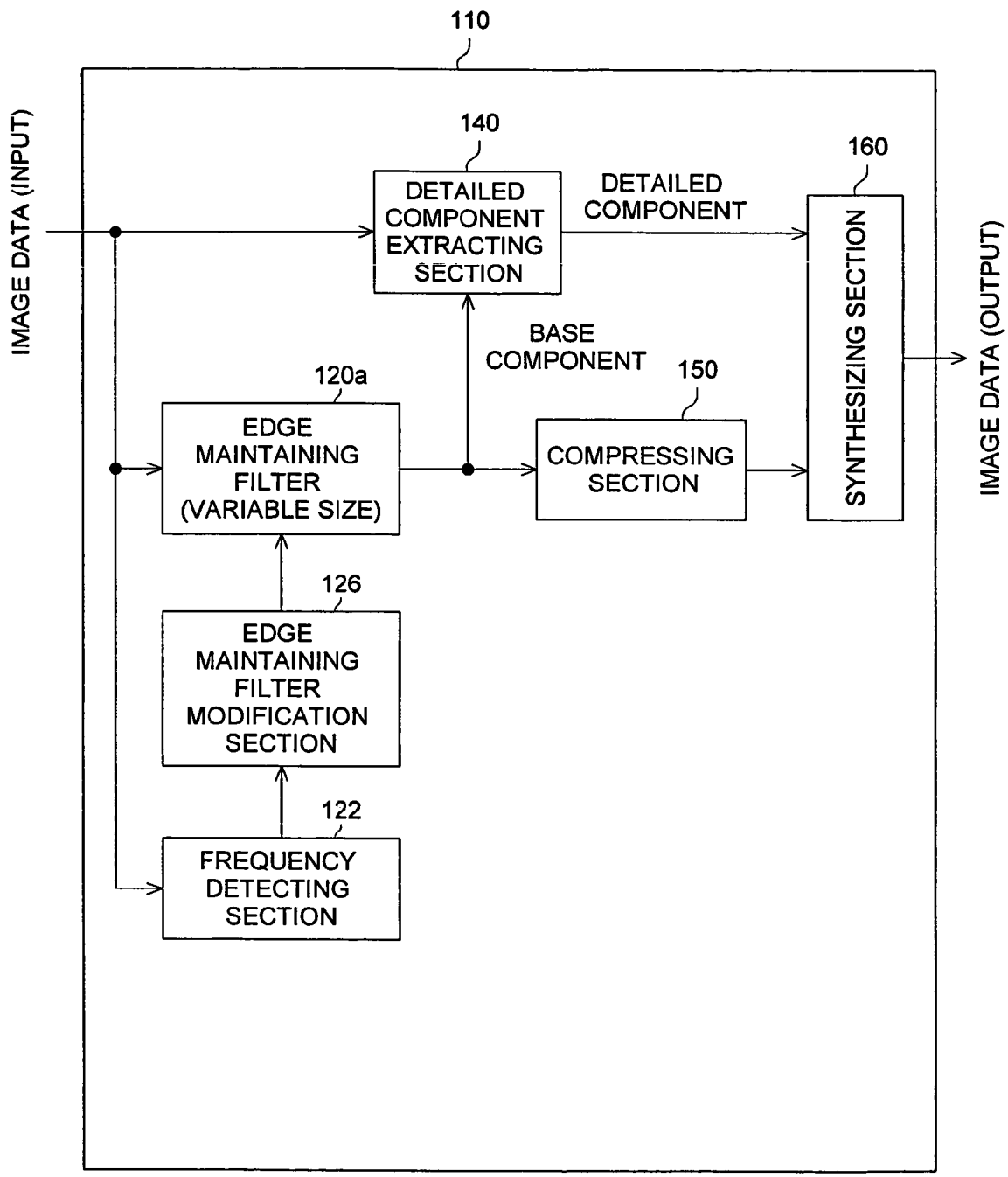
FIG. 11 is a block diagram representing a structure of the image processing section as a third embodiment.
Figure 12:
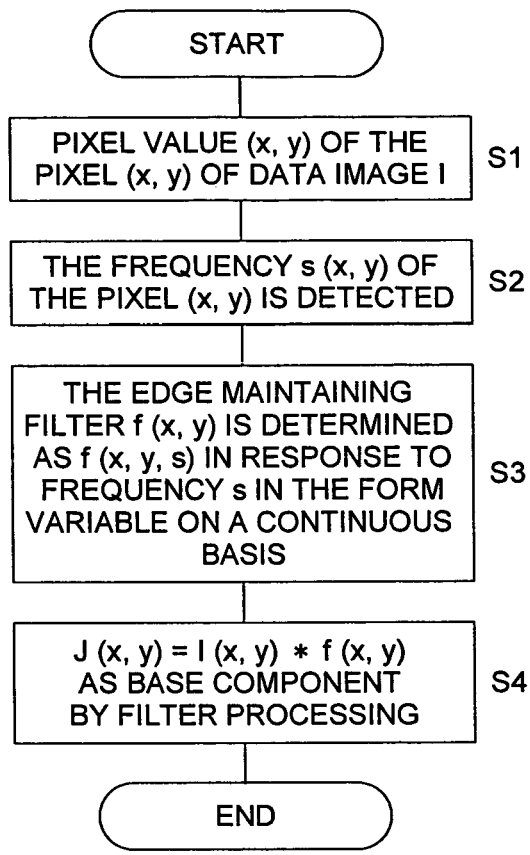
FIG. 12 is a flow chart representing the operation of the image processing apparatus.
Figure 13:
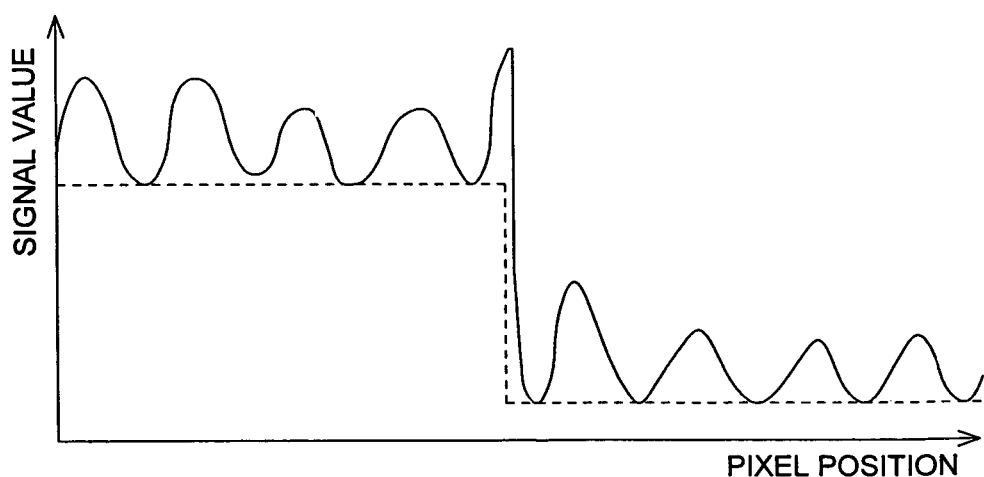
FIG. 13 is a block diagram representing another structure of the image processing section as a second embodiment.
Figure 14:
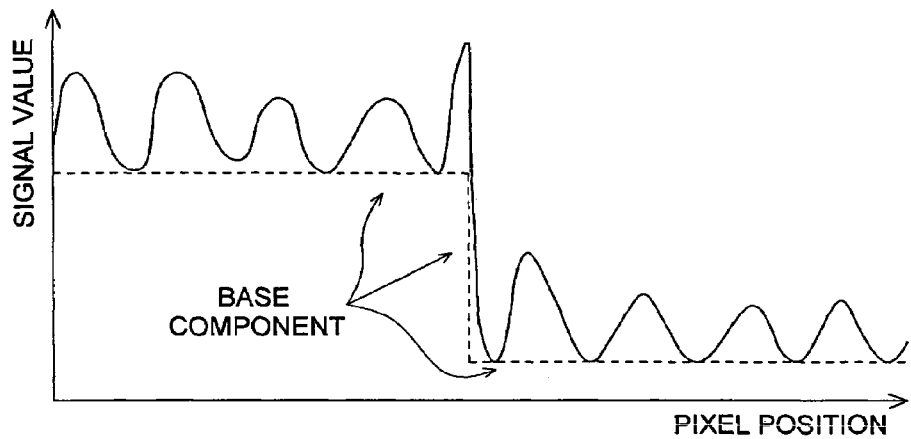
FIGS. 14(a), (b) and (c) are characteristic diagrams for extracting the base component using a smoothing filter in conventional image processing.
Figure 14:
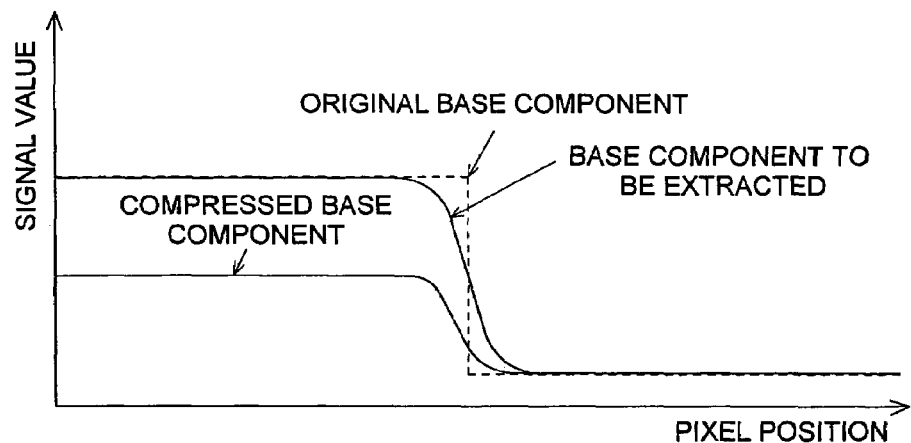
Figure 14:
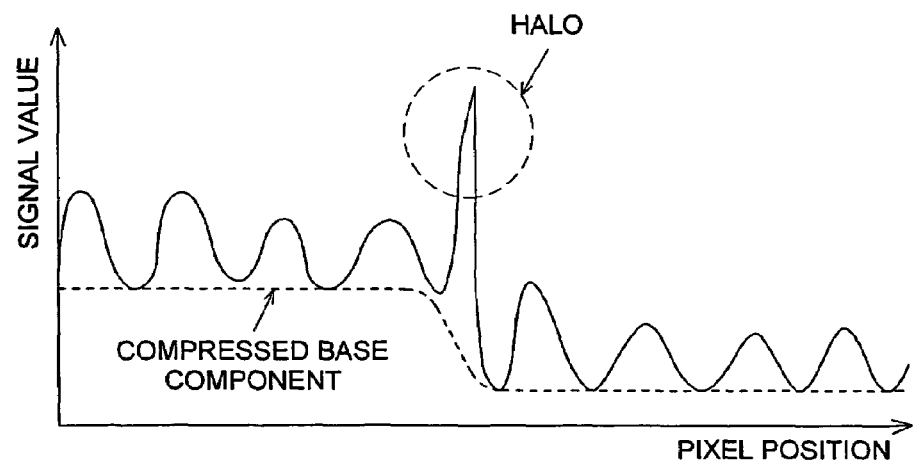
Figure 15:
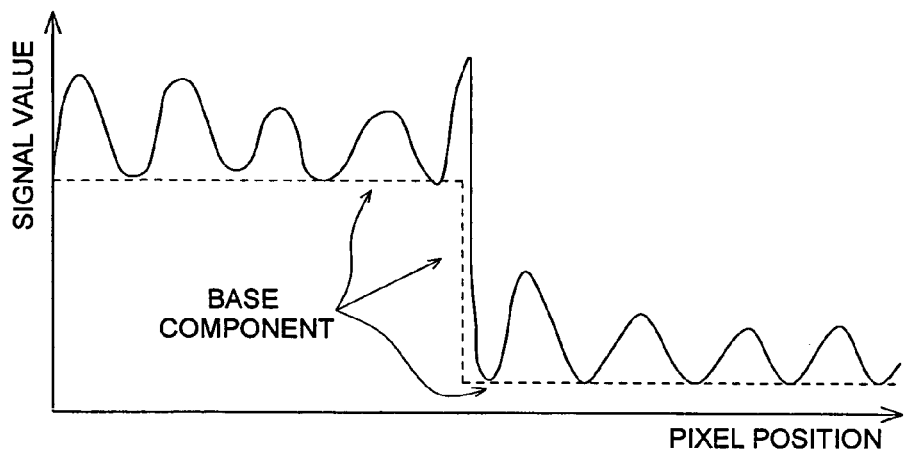
FIGS. 15(a), (b) and (c) are characteristic diagrams for extracting the base component using an edge preserving filter in conventional image processing.
Figure 15:
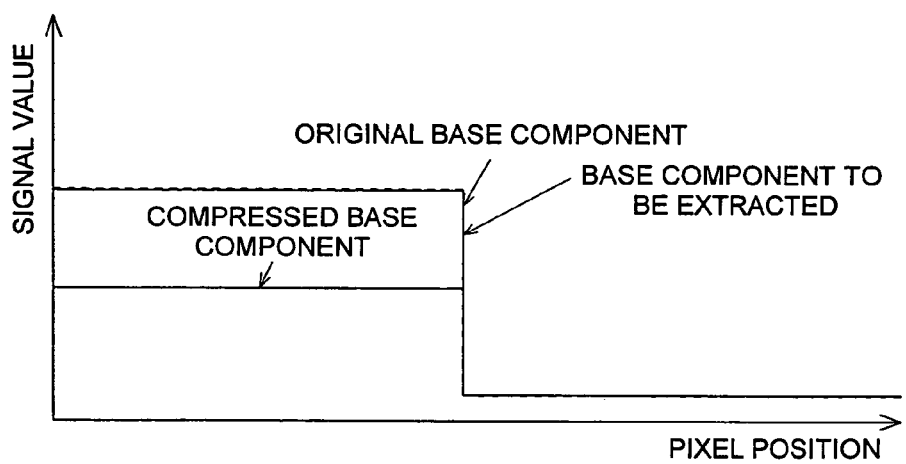
Figure 15:
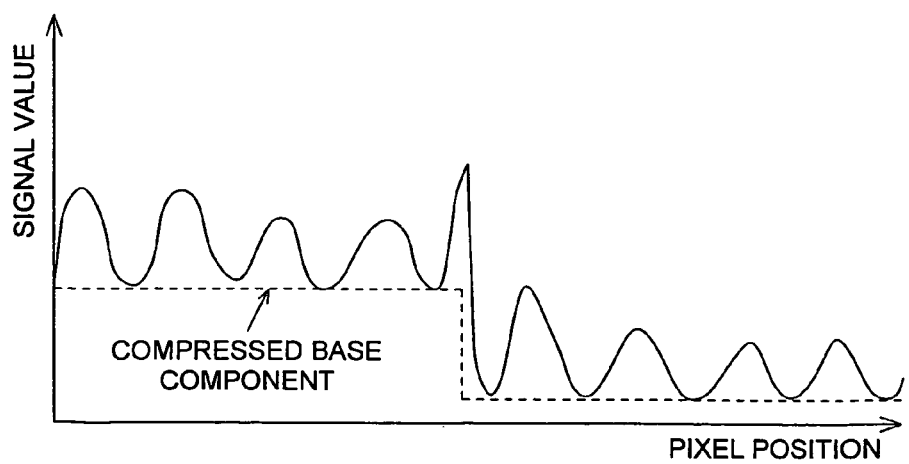

Referring to FIG. 11 and thereafter, a third embodiment will be described.

FIG. 11 is a block diagram representing a functional structure of the major portion of the image processing section. The examples of the specific circuits and apparatuses constituting the image processing apparatus are the same as those given in FIG. 2.

Reference numeral 110 denotes a computing section for performing computation operations for image processing in the image processing apparatus 100 (FIG. 2). The computing section 110 performs the computation operation for separating the detailed component contained in the image data from the base component for shifting the signal value of the detailed component a certain amount, in the image processing apparatus 100, and synthesizing them again into image data, subsequent to application of the processing adequate to each of them.

The computing section 110 is structured in such a way as to ensure that the edge portion is correctly preserved and the base component is extracted, independently of whether the edge of the base component contained in the image data is subjected to abrupt or gradual changes.

The computing section 110 functionally contains at least an edge preserving filter of variable size 120s, frequency detecting section 122, edge preserving filter modification section 126, detailed component extracting section 140, compressing section 150 and synthesizing section 160.

The edge preserving filter 120s performs filter processing for extracting the low-frequency component that is used to detect the area where the signal value of the base component of the image data is constant and the high frequency component used to detect the edge portion of the base component. The edge preserving filter 120s can be changed into the size that is variable on a continuous or stepwise basis.

Numeral 122 denotes a frequency detecting section for detecting the frequency component of each pixel. The frequency detecting section 122 detects to check the status of the frequency component when the edge preserving filter is used. The details of the frequency detecting section 122 are the same as those described in the first embodiment.

Numeral 126 denotes an edge preserving filter modification section for determining the size of the edge preserving filter 120s in such as way as to reduce the filter size for the higher frequency component and to increase the filter size for the lower frequency component in conformity to the frequency component for each pixel detected by the frequency detecting section 122. The edge preserving filter modification section 126 generates the edge preserving filter 120s of the size having been determined and or modifies the size of the edge preserving filter 120s in conformity to the determined size.

Numeral 140 indicates the detailed component extracting section for extracting the detailed component from the image data, by either subtracting the base component contained in the image data having been inputted from the image data or dividing the image data by the base component contained in the image data having been inputted. The detailed component in the sense in which it is used here refers to the component that varies on a step-by-step basis as compared with that of the peripheral pixel, and is mainly made up of high frequency components.

Numeral 150 indicates the compressing section for compressing the signal value of the base component at a certain rate, the base component having been extracted by the second filter 130 or the like.

Numeral 160 indicates the synthesizing section for synthesizing the compressed base component and detailed component. When subtraction has been performed in the detailed component extracting section 140, the synthesizing section 160 performs synthesis by addition of the base component to the detailed component. When the division has been performed in the detailed component extracting section 140, the synthesizing section 160 performs synthesis by multiplication between the base component and detailed component. Since the detailed component is not compressed although the base component having a greater amplitude of signal value is compressed, image data is outputted from this synthesizing section 160 without the subtle delineation of the image being damaged, although the portion pertaining to brightness of the image is compressed.

The following describes the operations of the image processing apparatus 100 as the third embodiment. It is assumed that the basic characteristics f (x, y, s) are made ready for the edge preserving filter 120s, and the filter size can be changed on a continuous or stepwise basis by the frequency components as required. It is preferred that the filter size should be changed on a continuous basis.

The image data I of the pixel value I (x, y) is inputted in the computing section 110 of the image processing apparatus 100 (S1), using pixel (x, y). To determine which size should be assigned to the edge preserving filter 120s in the first filter 120 to extract the base component, the frequency detecting section 122 performs processing of detection for the frequency component of the particular pixel (S2). The frequency component of the pixel in the sense in which it is used here refers to the frequency component produced by the difference from the signal values of the peripheral pixels.

The edge preserving filter modification section 126 determines the size of the edge preserving filter 120s in such as way as to reduce the filter size for the higher frequency component and to increase the filter size for the lower frequency component in conformity to the frequency component for each pixel detected by the frequency detecting section 122. The edge preserving filter modification section 126 generates the edge preserving filter 120s of the size having been determined and or modifies the size of the edge preserving filter 120s in conformity to the determined size (S3).

Each edge preserving filter is designed to identify the edge portion and to extract the base component, using the frequency characteristics varying with the filter size.

For example, an edge preserving filter of small sizes used to detect the high frequency component as the edge portion in order to conform to the abruptly changing edge portion; an edge preserving filter of intermediate size is used to detect the slightly lower frequency component or intermediate frequency component as the edge portion in order to conform to the gradually changing edge portion; and an edge preserving filter of large size is used to detect the low frequency component as the edge portion in order to conform to the more gradually changing edge portion.

Filter processing $(J(x, y)=I(x, y)*f(x, y))$ of the image data is implemented by the first filter 120 (S4). The base component J contained in the image data is extracted by the edge preserving filter 120s whose size has been determined to conform to the frequency component.

In the manner described above, the size of the edge preserving filter is determined and the edge preserving filter is generated. Alternatively, the filter size is changed in response to the frequency component of each pixel and the base component J contained in the image data is extracted by the edge preserving filter whose size has been changed.

In this case, when the film size is increased for the low through intermediate frequency component and the impact of the peripheral pixels is increased, blurring of the pixel will be facilitated and easier detection of the gradually changing edge portion will be ensured. This will reduce the possibility of error detection for abruptly changing edge portion. In the meantime, if variation is made on a continuous basis in such a way that the film size can be reduced for the intermediate through high frequency component, blurring of the pixel does not occur easily, and easier detection of the abruptly changing edge portion is ensured.

As described above, modification of the filter size is carried out in response to the result of detection by the frequency detecting section 122. In the extraction of the base component from the image data, independently of whether the edge of the base component exhibits an abrupt or gradual change, this arrangement ensures that the filter size is changed on a continuous basis in conformity to the change and the base component is extracted with the edge portion correctly preserved.

Embodiment 4

The fourth embodiment relates to the improvement of the edge preserving filter when it is used to remove noise. The edge preserving filter is used to extract the base component while preserving the edge portion of an image. Since the high frequency component of smaller amplitude is not extracted, the edge preserving filter can be used as a filter to remove noise. However, some noise components pass through the edge preserving filter, due to the frequency component and amplitude. Accordingly, it has been assumed that the edge preserving filter is not sufficient for use as a noise removing filter.

The fourth embodiment refers to the processing of removing the noise by the edge preserving filter (first filter processing) when the edge preserving filter is used to remove the noise component from the image data. It also refers to the processing of removing noise components passing through the edge preserving filter, using the amplitude and frequency component (second filter processing).

It contains first filter 120 as an edge preserving filter, a frequency detecting section 122 for detecting the frequency component of the image data and a second filter 130 for removing the noise component that has passed through the first filter 120.

The frequency detecting section 122 detects to find out whether or not the image data contains an intermediate frequency component located intermediate between the frequency component to be passed and the high frequency component as noise component. If the pixel having been subjected to the processing of edge preserving filter in the first filter 120 has the intermediate frequency component, the base component is smoothed by the smoothing filter f of the second filter 130 through the processing of smoothing filter by the second filter 130. Then the image data having the noise removed is outputted. If the pixel having been subjected to processing of edge preserving filter in the first filter 120 does not contain the intermediate frequency component, the result of processing by the edge preserving filter in the first filter 120 is directly outputted.

As described above, use of the edge preserving filter in the first filter processing removes the base component from the image data. Further, in the first filter processing, all the components over a certain frequency are identified as the noise components. Accordingly, the noise of part of the frequency components is incorrectly identified as being non-noise component. However, filter processing (second filter processing) is carried out to remove the noise component of the frequency component or amplitude having been identified incorrectly. Thus, noise components are removed in the final phase.

Thus, when the noise component is removed from the image data, the aforementioned procedure removes the noise component correctly, independently of a change in the amplitude and frequency component in the noise component.

As an alternative structure, it is also possible to make such arrangements that a different edge preserving filter in response to the result of detecting the frequency is employed to effectively remove the noise components from the image data, based on the method of the block diagrams shown in FIGS. 7, 9 and 11.

Other Embodiments

In the embodiments, detection of the frequency component of the pixel is carried out according to a change in the contrast with the peripheral pixels. Without being restricted thereto, the present invention can be embodied by various forms of method, for example, by using the standard deviation of the peripheral pixels as the standard, or by picking up a desired frequency using the Webrett function.

The specifications of the edge preserving filter are not restricted only to the results of changing the filter size. This arrangement allows a great variety of edge preserving filters to be handled.

The edge preserving filter in conformity to the frequency component can be set in advance. It can also be set as the function related to the frequency portion (a function containing the frequency as a parameter). This arrangement allows a great variety of processing to be handled.

The embodiments can be applied not only to the monochrome image data but also to the color image data. In the case of color image data, these embodiments can be applied to the image data for each of the R, G and B or Y, M, C and K colors. For the brightness and color difference, they can be applied to either the brightness alone or both the brightness and color difference.

According to the embodiments, when at least the base component is to be extracted from the image data containing the detailed component and base component, the base component is extracted using the edge preserving filter capable of extracting the base component while preserving the edge of the image data (first filter processing). The extracted base component is subjected to filter processing for removing the portion incorrectly detected by the edge preserving filter (second filter processing).

Use of the edge preserving filter in the first filter processing allows the base component to be extracted with the edge portion hardly blurred. In the first filter processing, all the components over a certain frequency are identified as edges. This allows part of the frequency component to be incorrectly identified as the edge. Thus, pseudo edges will be produced wherein the partial pixel values do not exhibit a gradual transition. However, the second filter processing is carried out to remove the frequency components of the pseudo edges (the second filter processing). This arrangement ensures that the base component detected in the final phase does not contain any incorrectly detected component.

Thus, when the base component is extracted from the image data, the edge portion is correctly preserved and the base component is extracted, independently of whether the edge of the base component contained in the image data is subjected to abrupt or gradual changes.

According to the embodiments, the low frequency component for detecting the area where the signal value of the base component is constant, and the high frequency component for detecting the edge portion of the base component are extracted by the edge preserving filter, and the portion incorrectly detected by the edge preserving filter is removed. This filter processing smoothes the base component extracted by the edge preserving filter, if the image data contains the intermediate frequency component located between the low frequency component for extracting the base component, and high frequency component for extracting the edge portion of the base component.

In the first filter processing, use of the edge preserving filter allows the base component to be extracted, with the edge portion of the high frequency component hardly being blurred. In the first filter processing, all the components over a certain frequency are identified as edges of high frequency component. This allows part of the intermediate frequency component to be incorrectly identified as the edge. Thus, pseudo edges will be produced wherein the partial pixel values do not exhibit a gradual transition. However, the second filter processing is carried out to remove the frequency components of the pseudo edges (the second filter processing). This arrangement ensures that the base component detected in the final phase does not contain any incorrectly detected component.

Thus, when the base component is extracted from the image data, the edge portion is correctly preserved and the base component is extracted, independently of whether the edge of the base component contained in the image data is subjected to abrupt or gradual changes.

According to the embodiments, when at least the base component is to be extracted from the image data containing the detailed component and base component, the frequency component is detected for each pixel of the image data by the pixel and peripheral pixels. The size of the edge preserving filter, capable of extracting the base component while preserving the edge of the image data, is determined in response to the frequency component for each pixel having been detected, in such a way that the filter size is reduced for the higher frequency component and is increased for the lower frequency component. This edge preserving filter is used to extract the base component.

In this case, the filter size is increased for the low through intermediate frequency portions so that the influence of the peripheral pixels is increased. This arrangement facilitates blurring of the pixel and reduces the possibility of error detection for abruptly changing edge portion. In the meantime, if variation is made on a continuous basis in such a way that the film size can be reduced for the intermediate through high frequency component, blurring of the pixel does not occur easily, and easier detection of the abruptly changing edge portion is ensured.

Thus, when the base component is extracted from the image data, the edge portion is correctly preserved and the base component is extracted, independently of whether the edge of the base component contained in the image data is subjected to abrupt or gradual changes. This is because the filter size is determined to conform to such changes.

According to the embodiments, when at least the base component is to be extracted from the image data containing the detailed component and base component, the frequency component is detected for each pixel of the image data by the pixel and peripheral pixels. The size of the edge preserving filter, capable of extracting the base component while preserving the edge of the image data, is determined in response to the frequency component for each pixel having been detected, in such a way that the filter size is reduced for the higher frequency component and is increased for the lower frequency component. This edge preserving filter is used to extract the base component.

In this case, the filter size is increased for the low through intermediate frequency portions so that the influence of the peripheral pixels is increased. This arrangement facilitates blurring of the pixel and reduces the possibility of error detection for abruptly changing edge portion. In the meantime, if variation is made on a continuous basis in such a way that the film size can be reduced for the intermediate through high frequency component, blurring of the pixel does not occur easily, and easier detection of the abruptly changing edge portion is ensured.

Thus, when the base component is extracted from the image data, the edge portion is correctly preserved and the base component is extracted, independently of whether the edge of the base component contained in the image data is subjected to abrupt or gradual changes. This is because the filter size can be changed on a continuous basis to conform to such changes.

According to the embodiments, when at least the base component is to be extracted from the image data containing the detailed component and base component, the frequency component is detected for each pixel of the image data by the pixel and peripheral pixels. A plurality of edge preserving filters varying in size are made ready, wherein these edge preserving filters are capable of extracting the base component while preserving the edge of the image data through the filtering operation using a filter of a predetermined size. The base component is extracted by the edge preserving filter of smaller size for the pixel of the frequency component higher than a predetermined threshold value, whereas the base component is extracted by the edge preserving filter of greater size for the pixel of the frequency component lower than a predetermined threshold value.

In this case, the filter size is increased for the low through intermediate frequency portions so that the influence of the peripheral pixels is increased. This arrangement facilitates blurring of the pixel and reduces the possibility of error detection for abruptly changing edge portion. In the meantime, if the film size is reduced for the intermediate through high frequency component, blurring of the pixel does not occur easily, and easier detection of the abruptly changing edge portion is ensured.

Thus, when the base component is extracted from the image data, the edge portion is correctly preserved and the base component is extracted, independently of whether the edge of the base component contained in the image data is subjected to abrupt or gradual changes. This is because the filter conforming to such changes are selected.

According to the embodiments, the edge preserving filter has a function of extracting the low frequency component for detecting the area where the signal value of the base component is constant, and the high frequency component for detecting the edge portion of the base component. A plurality of edge preserving filters each detect edge portions contained in the different base components, through the filtering operations using the filters having different sizes. This arrangement allows the high frequency components of different frequencies to be extracted.

Of the edge preserving filters capable of extracting the base component while preserving the edge of the image data, an edge preserving filter having different characteristics is selected to conform to the frequency component for each pixel. Each edge preserving filter extracts the base component while preserving the edge of the image data, based on different characteristics.

Thus, the frequency characteristics for identifying the edge portion as an edge in response to the frequency component of the pixel are changed. When the base component is extracted from the image data, the edge portion is correctly preserved and the base component is extracted, independently of whether the edge of the base component contained in the image data is subjected to abrupt or gradual changes. This is because the filter is selected to conform to these changes.

According to the embodiments, noise is removed from the image data using the edge preserving filter capable of removing the noise (first filter processing), wherein the high frequency component of smaller amplitude is not extracted. Filter processing (second filter processing) is provided to remove the noise that has passed through the edge preserving filter due to amplitude and frequency component.

In the first filter processing, the edge preserving filter is used. This removes the major portion of noise. Further, in the first filter processing, all the components over a certain frequency are identified as noise. This may allow some of the components to be incorrectly identified as non-noise components. However, the second filter processing (second filter processing) is carried out to remove the noise of the frequency component and amplitude to be incorrectly identified. This arrangement ensures that there is noise in the final phase.

The arrangement ensures noise to be correctly removed from the image data, independently of any change in the amplitude and frequency component of the noise.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing method, for extracting a base component from image data including a detailed component and the base component implemented on an image processing apparatus, the image processing method comprising:
    extracting the base component by application of an edge preserving filter to the image data; and
    correcting the extracted base component corresponding to a predetermined frequency component of the image data;
    wherein the predetermined frequency is an intermediate component located between a low frequency component corresponding to the base component and a high frequency component corresponding to an edge portion.

2. The image processing method claim 1, wherein the correction of the base component is smoothing of the base component.

3. The image processing method of claim 2, wherein the correction of the base component is application of a smoothing filter for smoothing the base component.

4. The image processing method of claim 1, further comprising:
    extracting the detailed component by removing from the image data the base component having been obtained by the correction;
    compressing the base component having been obtained by the correction; and
    adding the detailed component having been extracted, to the compressed base component.

5. An image processing method, for extracting a base component from image data including a detailed component and the base component implemented on an image processing apparatus, the image processing method comprising:
    detecting a frequency component of the image data;
    extracting the base component by applying an edge preserving filter conforming to the frequency component having been detected, to the image data;
    extracting the detailed component by removing from the image data the base component having been obtained by the extraction;
    compressing the base component having been obtained by the extraction; and
    adding the detailed component having been extracted, to the compressed base component.

6. The image processing method of claim 5, wherein the frequency component of the image data is detected for each pixel of the image data based on the pixel and peripheral pixels.

7. The image processing method of claim 5, wherein the base component is extracted using the edge preserving filter whose size differs according to the frequency component.

8. The image processing method of claim 7, wherein the edge preserving filter used to extract the base component has a greater size for a low frequency component than for a high frequency component.

9. The image processing method of claim 7, further comprising:
    generating an edge preserving filter having a size conforming to the frequency component.

10. The image processing method of claim 5, further comprising: selecting the edge preserving filter having a size conforming to the frequency component, from a plurality of edge preserving filters kept in storage.

* * * * *